United States Patent [19]
Gendron

[11] 3,931,800
[45] Jan. 13, 1976

[54] SYSTEM TO CONVERT LIQUID FUEL TO GAS

[76] Inventor: Normond Gendron, 641 53rd St., West Palm Beach, Fla. 33407

[22] Filed: Nov. 27, 1974

[21] Appl. No.: 527,517

[52] U.S. Cl............ 123/133; 123/122 E; 123/122 H
[51] Int. Cl.² ........................................ F02M 31/00
[58] Field of Search............ 123/122 E, 133, 122 H, 123/179 H

[56] References Cited
UNITED STATES PATENTS

| | | | |
|---|---|---|---|
| 3,021,681 | 2/1962 | Perry | 123/133 |
| 3,799,125 | 3/1974 | Hutchinson | 123/133 |

*Primary Examiner*—Charles J. Myhre
*Assistant Examiner*—R. H. Lazarus

[57] ABSTRACT

A system to convert liquid fuel for an internal combustion engine to a gaseous state for injection while in the gaseous state into the internal combustion engine which includes a heater in heat exchanging relation with the exhaust of an engine and a fuel pump to supply fuel to the heater means, whereby the preheated fluid is in the gaseous state when injected into the engine for more complete combustion.

4 Claims, 1 Drawing Figure

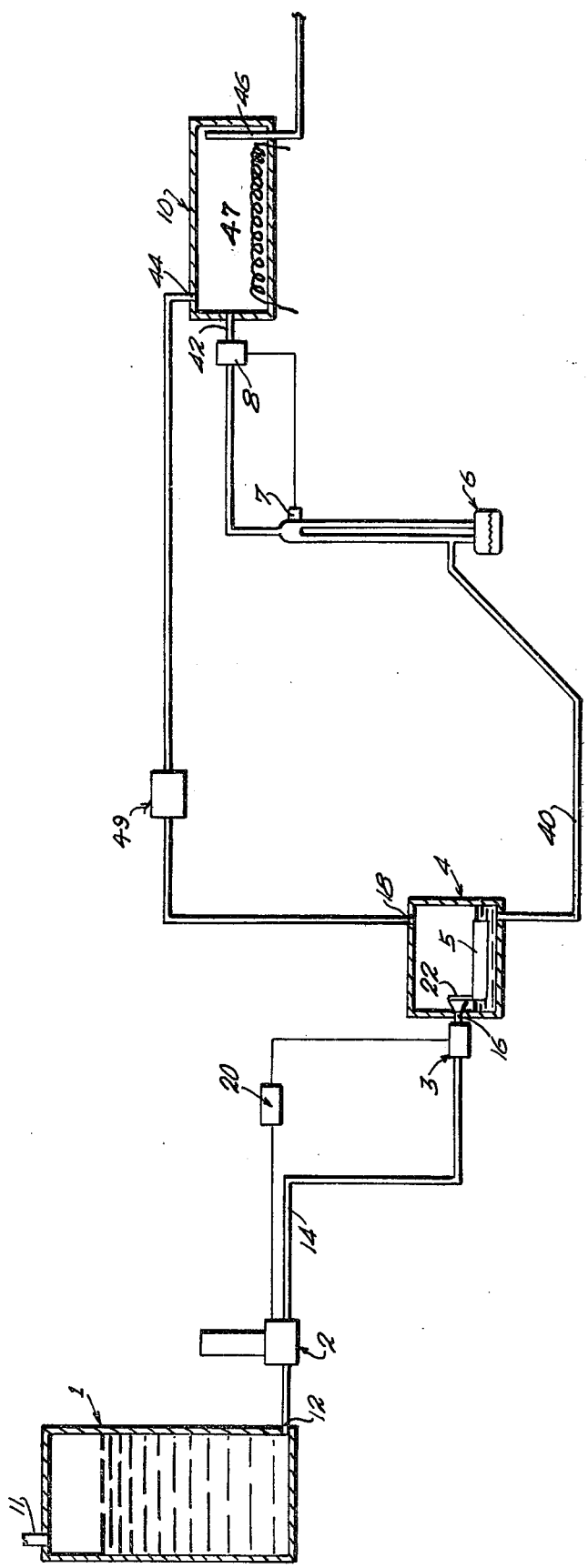

SYSTEM TO CONVERT LIQUID FUEL TO GAS

FIELD OF THE INVENTION

This invention relates to internal combustion engines and, more particularly, to a preheating device to preheat gasoline so that it enters the internal combustion engine at an elevated temperature and gaseous state for more complete combustion.

BACKGROUND OF THE INVENTION

As is perhaps well known, gases burn more completely when injected into an internal combustion engine chamber than do liquid fuels. This invention provides a means for preheating the gasoline to elevate its temperature preferably to a gaseous state prior to injection into the internal combustion engine and which preheats the gasoline by utilizing the exhaust heat of the engine.

It is, accordingly, an object of this invention to provide a preheater means in the fluid supply line to an internal combustion engine which includes a heater means which is arranged in close heat-exchanging relation to the heated exhaust parts of the engine and which may include a secondary heating means to heat the gasoline for a predetermined time prior to the time at which the engine has developed its operating engine heat.

It is a general object of this invention to provide an improved system for increasing efficiency of gasoline fuel and other combustible materials and to preheat the gas prior to injection of the same into an internal combustion engine which is simple and inexpensive to install and is adapted to increase engine utilization of available energy from a fuel.

DESCRIPTION OF THE DRAWINGS

The drawing describes in schematic form a system in accordance with this invention.

DESCRIPTION OF PREFERRED EMBODIMENT

Referring to the drawings the device is there shown. It is a system for use in preheating a fuel to convert it to a gaseous state prior to injection into the combustion chamber of an engine. A fuel reservoir or tank as is conventional is designated by the numeral 1. It includes an inlet 11 and an outlet 12; and it is connected through a conduit 14 to a surge tank 4 having an inlet and outlet, 16 and 18. In fluid communication in the conduit means 14 a fuel pump 2 is provided. To control the operation of the pump 2, electronic control means 20 are provided to control the liquid level in the surge tank.

Signal means are provided to sense the liquid level in the surge tank to signal the control means to operate the fuel pump. The signal means may comprise a float 5 in the surge tank constrained by structure to vertical movement in a predetermined path only. This may be by reason of the configuration of the surge tank and a companionate configuration for the float. The float is adapted to engage a member 22 which is pivotally connected to the check valve operator and extends into the path of movement of the float so as to be responsive to the liquid level of the surge tank to open a check valve 3 when the float is below a certain level and to close the check valve when at a predetermined level and to correspondingly operate the fuel pump when the liquid level is below the predetermined normal fuel level desired in the tank. Any suitable operator means may be provided to operate the fuel pump to maintain a normal predetermined level in the surge tank.

A conduit circuit generally designated by the numeral 40 extends from the outlet 18 of the surge tank to the combustion chamber on which the device is installed. The conduit circuit includes a first heater means 6 to convert the liquid fuel to a gas, which heater means comprises a heat exchanging member in heat exchanging relation closely adjacent the exhaust of a combustion chamber, not shown. The conduit circuit 40 also includes a storage tank 10 with an inlet 42 and a first outlet 44 and a second outlet 46 which is elevated with respect to the level of the tank so as to collect gaseous vapors only. The conduit circuit also includes a normally closed gate valve 8 intermediate the first heater means and the inlet 42 of the storage tank 10. This is controlled by a temperature responsive switching means 7 which is provided to sense the temperature in the conduit circuit intermediate the first heater means and the storage tank. This latter switching means, designated by the numeral 7 is effective to permit fluid to enter the tank 10 while it is in a gaseous state only. It is electrically connected and operates the gate valve 8. This is so the storage tank will at all times contain a supply of fuel for metering with a conventional metering means (not shown) to the combustion chamber of a vehicle (not shown), and the switch means 7 only is open when the heat exchange takes place, i.e., the engine is operating.

Second heater means 47 may be provided in the storage tank 10 to operate until the switch 7 has been open, that is until the engine has started and built up heat so that the heat exchanging operation is taking place at the first heater means and the second heater means changes any gas that has cooled into the liquid state in the tank 10 back into a gas for an initial engine start period.

A safety valve means generally designated by the numeral 49 may be provided which includes a line connected to the combustion chamber reservoir 10 at 44 and to the outlet 18 and to open the safety valve 49 in the event of a predetermined dangerous pressure built up. An electric time delay circuit means, not shown, may be provided to energize the second heater means and to hold the valve 8 closed for a period after the ignition has been turned on and until the engine heat is developed. The time delay circuit means are set for a predetermined period of time, so as to cause the second heater to operate until such time as the heat exchanger of the first heater means is functioning in a normal manner.

What is claimed is:

1. A fuel preheating system to convert liquid fuel to a gaseous state prior to injection into a combustion chamber comprising,
   a fuel reservoir with an inlet and an outlet,
   a surge tank with an inlet and an outlet,
   first conduit means interconnecting the outlet of the fuel reservoir and the inlet of the surge tank,
   a fuel pump in said first conduit means,
   said surge tank including a one-way, normally closed check valve means to control the liquid level therein,
   operator means for the check valve and fuel pump comprising,
   a float in the surge tank constrained to vertical movement in a predetermined path, and a member in said path of movement of the float responsive to the liquid level in the surge tank to open and close the valve means;
signal means interconnecting the check valve and the fuel pump to limit the amount of fuel in said tank;
operator means to operate the fuel pump to maintain a normal predetermined liquid level in said surge tank,
a conduit circuit interconnecting the surge tank and the combustion chamber, and including, in series,
a first heater means to convert the liquid fuel to a gas, said first heater means being in heat exchanging relation adjacent the exhaust of the combustion chamber,
a storage tank with an inlet and an outlet,
a normally closed gate valve intermediate the first heater means and the inlet of the storage tank, and
temperature responsive operator means to operate the gate valve, said temperature responsive operator means being affixed to said first heater means to sense the temperature at said first heater means.

2. The system of claim 1 including a pressure regulating means comprising a line in open communication with the interior of the surge tank and said storage tank and including a pressure regulating valve intermediate the length thereof effective to limit pressure equalization between the storage tank and the surge tank so that the relative pressure in the surge tank is at all times the same as or less than the pressure in said storage tank.

3. The system as set forth in claim 1 wherein a second heater means is provided in said storage tank and normally not energized for operation only upon initiation of combustion in the combustion chamber for a predetermined interval of time to convert fuel in a liquid state in the storage tank to a gaseous state upon initiation of combustion in the combustion chamber.

4. The system as set forth in claim 1 wherein safety valve means are provided including a first line connected to the storage tank and a safety valve in said line and means to open the safety valve which are pressure responsive.

* * * * *